United States Patent [19]

Yamamoto

[11] Patent Number: 5,012,419
[45] Date of Patent: Apr. 30, 1991

[54] SYSTEM AND METHOD FOR AUTOMATICALLY CONTROLLING VEHICLE SPEED TO DESIRED CRUISE SPEED

[75] Inventor: Isao Yamamoto, Kanagawa, Japan

[73] Assignee: Nissan Motor Company, Ltd., Japan

[21] Appl. No.: 288,083

[22] Filed: Dec. 22, 1988

[30] Foreign Application Priority Data

Dec. 28, 1987 [JP] Japan .................. 62-329579

[51] Int. Cl.⁵ .............................. B60K 31/00
[52] U.S. Cl. .................. 364/426.04; 180/170; 180/177; 74/866
[58] Field of Search .......... 364/426.04, 424.1; 180/177-179; 74/864, 866

[56] References Cited

U.S. PATENT DOCUMENTS

| | | | |
|---|---|---|---|
| 4,421,192 | 12/1983 | Ito et al. | 180/179 |
| 4,660,672 | 4/1987 | Katou | 180/175 |
| 4,697,478 | 10/1987 | Mastumoto et al. | 74/859 |
| 4,709,595 | 12/1987 | Hayama | 74/864 |
| 4,736,813 | 4/1988 | Hayama et al. | 180/177 |
| 4,809,183 | 2/1989 | Eckert | 364/426.04 |
| 4,833,945 | 5/1989 | Kondo | 74/866 |
| 4,845,621 | 7/1989 | Kawata et al. | 364/426.04 |

FOREIGN PATENT DOCUMENTS 59-58134 4/1984 Japan.

Primary Examiner—Thomas G. Black
Attorney, Agent, or Firm—Lowe, Price, LeBlanc, Becker & Shur

[57] ABSTRACT

A system and method for automatically controlling a vehicle speed to a desired cruise speed are disclosed in which when the vehicle speed is reduced by a first predetermined value from a set and stored cruise speed at which the vehicle is cruising during the operation of the automatic cruise control, the gear range of a vehicular transmission is shifted down and simultaneously the set and stored cruise speed is updated to reduce the set and stored cruise speed by a second predetermined value so that the vehicle speed coincides with the updated cruise speed. In addition, after a predetermined time has elapsed, the gear range is shifted up and the updated cruise speed is returned to the original cruise speed.

10 Claims, 3 Drawing Sheets

5,012,419

SYSTEM AND METHOD FOR AUTOMATICALLY CONTROLLING VEHICLE SPEED TO DESIRED CRUISE SPEED

BACKGROUND OF THE INVENTION

1. Field of the Invention

The present invention relates to a system and method for automatically controlling a vehicle speed to a desired vehicle speed applicable to an automatic transmission mounted vehicle.

2. Background of the Art

Various types of automatic cruise speed controlling systems have been proposed in which the vehicle speeds are automatically controlled to cruise speeds without accelerator pedal operation.

Such automatic cruise speed controlling systems are exemplified by U.S. patent applications Ser. No. 055,516, now U.S. Pat. No. 4,835,696 filed on May 29, 1987, Ser. No. 057,086, now U.S. Pat. No. 4,829,438, filed on June 3, 1987, Ser. No. 061,295, now U.S. Pat. No. 4,870,584, filed on June 12, 1987, Ser. No. 109,031, now U.S. Pat. No. 4,845,622 filed on Dec. 9, 1987, Ser. No. 143,092, filed on Jan. 12, 1988, Ser. No. 146,558, now U.S. Pat. No. 4,908,704 filed on Jan. 21, 1988, Ser. No. 169,218, now U.S. Pat. No. 4,914,595 filed on Mar. 16, 1988, and Ser. No. 241,453, filed on Sept. 8, 1988 and a Japanese Patent Application First Publication sho 59-58134 published on Apr. 3, 1984.

This Japanese Patent Application document discloses a system similar to those disclosed in the U.S. patents. Vehicle speed is automatically controlled to a desired cruise speed with a comparator for generating a speed difference signal indicative of actual vehicle speed relative to a desired set cruise speed value. An actuator adjusts an opening angle of a throttle valve for the vehicle to adjust the vehicle speed to minimize the difference between actual and desired speed. The throttle valve opening angle is detected; if the opening angle exceeds a predetermined value an overdrive mechanism of an automatic transmission of the vehicle is released.

In such automatic cruise controlling systems which have applied to automatic transmission mounted vehicles, when the vehicle speed is decreased by a predetermined value (for example, 6 Km/h) from a set cruise speed due to the vehicle running on an ascending slope during the automatic cruise control operation with the transmission in an overdrive mode, the overdrive mode is released to prevent a drop of vehicle speed and the overdrive mode is recovered when the vehicle speed approaches the set cruise speed.

However, engine driving torque is instantaneously increased when a down shift operation is carried out in the automatic transmission and abrupt acceleration occurs. Consequently, the vehicle occupant(s) feels a large acceleration and vehicle comfort is reduced.

SUMMARY OF THE INVENTION

It is an object of the present invention to provide a system for and method of automatically controlling vehicle speed to a desired cruise speed in which vehicle comfort caused by the automatic cruise control can be assured when the vehicle runs on an ascending slope that causes the vehicle speed to decrease.

The above-described object can be achieved by providing a system for automatically controlling vehicle speed to a desired cruise speed, comprising: (a) first means for detecting a current vehicle speed; (b) second means through which the current vehicle speed is set to the cruise speed at which the vehicle is desired to cruise; (c) third means responsive to a set command from the second means for storing the set cruise speed, deriving a speed difference between the current vehicle speed and the set cruise speed, and adjusting an operating variable of a vehicular engine driving force adjusting mechanism on the basis of the speed difference so that the current vehicle speed coincides with the stored cruise speed; (d) fourth means for determining whether the current vehicle speed is reduced and deviated from the set cruise speed at least by a first predetermined value; (e) fifth means for shifting down a gear shift range in a vehicular transmission mechanism on according to a result of determination by the fourth means; and (f) sixth means for updating the stored cruise speed so as to reduce the set cruise speed by a second predetermined value so as to prevent an abrupt increase of an engine torque according to the result of determination by the fourth means.

The above-described object can also be achieved by providing a method of automatically controlling a vehicle speed to a desired cruise speed, comprising the steps of: (a) detecting a current vehicle speed; (b) storing the current vehicle speed as the cruise speed at which the vehicle is desired to cruise the cruise speed being set through a set switch; (c) deriving a speed difference between the current vehicle speed and the stored cruise speed, adjusting an operating variable of a vehicular engine driving force adjusting mechanism on the basis of the difference so that the vehicle speed coincides with the stored cruise speed; (d) determining whether the current vehicle speed is reduced by a first predetermined value from the stored cruise speed; (e) shifting down a gear range in a transmission mechanism when determining that the vehicle speed is reduced by the first predetermined value from the stored cruise speed and simultaneously updating the stored cruise speed to reduce the stored cruise speed by a second predetermined value so that the vehicle speed coincides with the updated cruise speed.

DETAILED DESCRIPTION OF THE PREFERRED EMBODIMENT

Reference will hereinafter be made to the drawings in order to facilitate understanding of the present invention.

Figure 1:
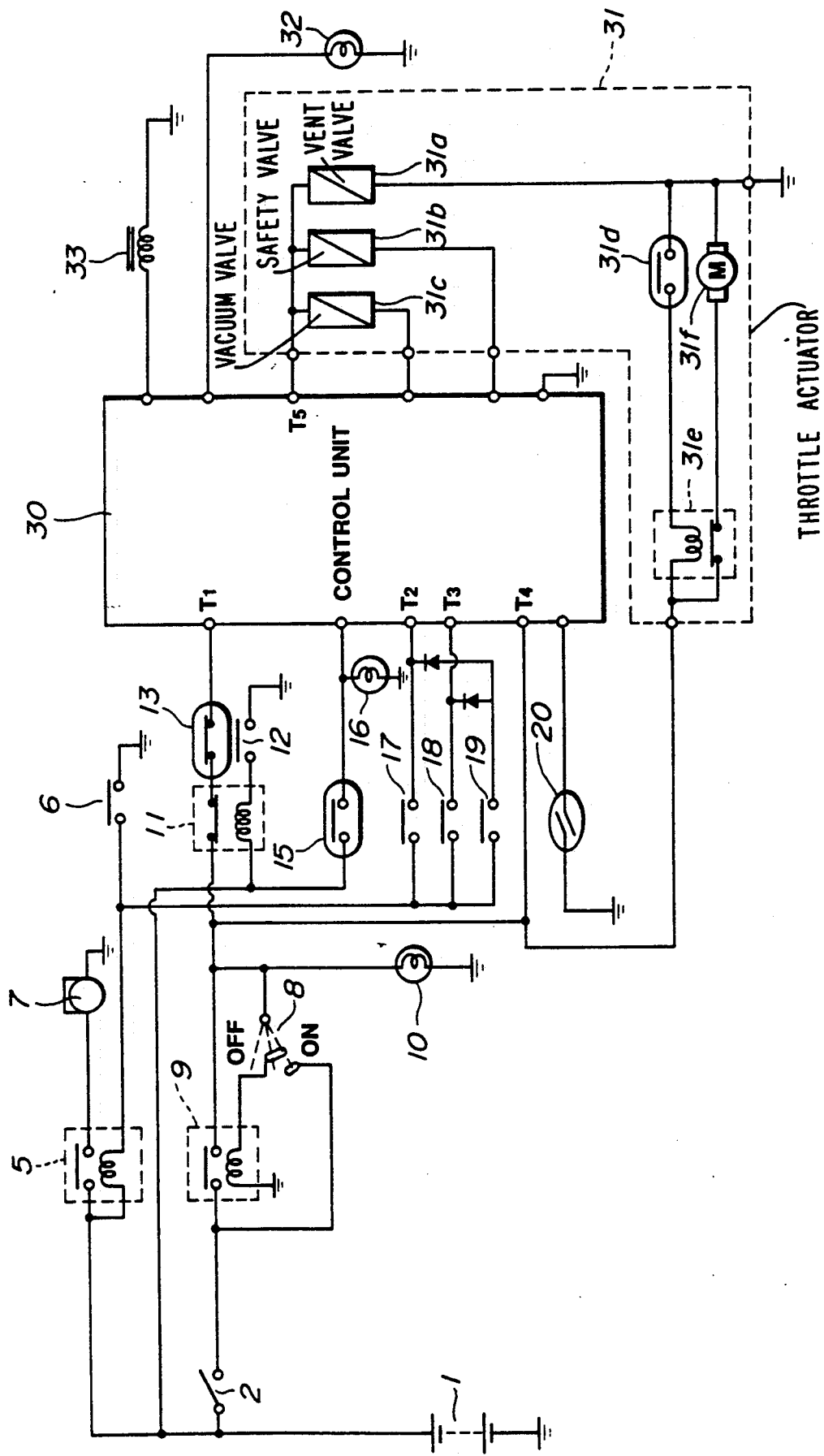
FIG. 1 is a schematic circuit wiring diagram of a system for automatically controlling a vehicle speed to a desired cruise speed according to the present invention.

FIG. 1 is a circuit diagram of a preferred embodiment of a system for automatically controlling vehicle speed to a desired vehicle speed.

It is noted that the automatic cruise speed controlling system shown in FIG. 1 is exemplified by a U.S. patent application Ser. No. 169,218, now U.S. Pat. No. 4,914,595 filed on Mar. 16, 1988 and Ser. No. 262,857 having a priority based on a Japanese Utility Model Application No. sho 62-163193 filed on Oct. 27, 1987. The contents of the two U.S. patent applications are hereby incorporated by reference.

However, although in the latter U.S. patent application an inhibit switch denoted by 13 and normally open switch 14 are installed, such switches are omitted here as shown in FIG. 1.

In addition, although in the later U.S. patent application a clutch switch denoted by 15 is used in the case of a manual transmission, an inhibitor switch 12 and a cut relay 11 are installed. When the inhibitor switch 12 is turned on, a normally closed contact of the cut relay 11 is open. A normally closed brake switch 13 is open when a brake pedal is depressed. The cut relay 11 and brake switch 13 are connected in series with each other between a cruise control main relay 9 and input terminal $T_1$ of a control unit 30. In addition, an OD canceling solenoid 33 is connected to an output terminal of the control unit 30 which is energized in response to a control signal derived from the control unit 30.

When the OD canceling solenoid 33 is energized, a control valve (not shown) of an automatic transmission of the vehicle is actuated so that an overdrive (OD) is released and a four speed range is shifted to a third speed range. Then, when the OD canceling solenoid 33 is deenergized, the speed range in the third speed range is returned to the four speed range.

Numeral 31 denotes a throttle actuator, numeral 17 denotes a set/coast switch, numeral 18 denotes an acceleration switch, and numeral 19 denotes a resume switch (cancel switch).

Next, an operation of the system for automatically controlling the vehicle speed to the desired cruise speed shown in FIG. 1 during the vehicle run on an ascending slope will be described below with reference to FIGS. 2 and 3.

When the vehicle speed reaches a vehicle speed value at which the driver desires to cruise and the driver depresses the set/coast switch 17, the control unit 30 stores the set cruise speed $V_s$ into a memory thereof in a step (F-1) and reads an actual vehicle speed V into the control unit 30 from a vehicle speed sensor denoted by 20 in FIG. 1 in a step (F-2). The throttle actuator 31 is controlled according to a difference between the vehicle speed V and the set cruise speed $V_s$ so that an opening angle of an engine throttle valve is adjusted, thus the vehicle speed being maintained at the set cruise speed $V_s$ in a step (F-3).

When the vehicle approaches an ascending slope, the vehicle speed V decreases. If the actual vehicle speed V is lower than the set cruise speed $V_s$ by a constant value ALPHA (ALPHA=6 Km/h) in a step (F-4), the control unit 30 outputs a control signal to the OD canceling solenoid 33 to energize the OD canceling solenoid 33, thus the shift down to a third speed range from a four speed range in a step (F-5). At this time, the set cruise speed $V_s$ stored in the memory is updated toward the decreased cruise speed by a constant value BETA (BETA=4.5 Km/h) in a step (F-6). The control unit 30 determines whether a predetermined time (for example, 16 seconds) has passed since the shift down operation started in a step (F-7). If the predetermined time has passed in the step (F-7), the OD canceling solenoid 33 is deenergized and the shift up operation from the third speed to the four speed is carried out in a step (F-8). The set cruise speed is returned to the original set value $V_s$ with the value of BETA added in a step (F-9).

Figure 2:
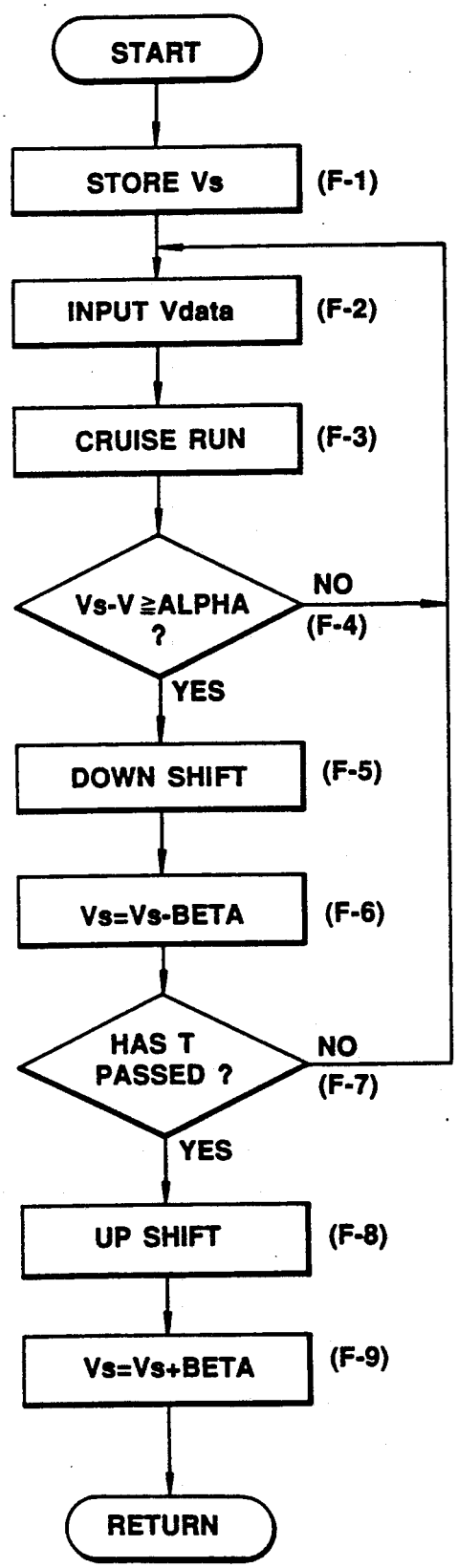
FIG. 2 is an operational flowchart for explaining an operation of the automatic cruise speed controlling system shown in FIG. 1.
Figure 3:
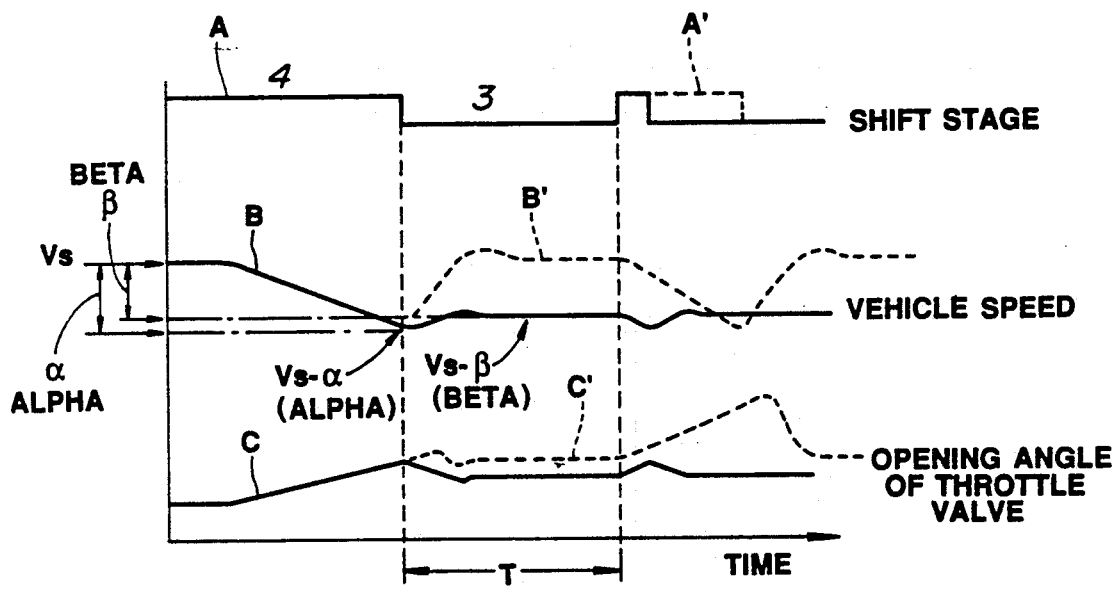
FIG. 3 is a characteristic graph for explaining the operation of the automatic cruise controlling system shown in FIGS. 1 and 2.

FIG. 3 shows a series of results of a cruise control operation executed in FIG. 2.

It is noted that in FIG. 3, numeral A denotes a shift stage of the automatic transmission, B denotes the actual vehicle speed V, C denotes the opening angle of the throttle valve, and A', B', and C' denote shift stage, actual vehicle speed, and opening angle of the throttle valve in the case of one of the previously proposed cruise controlling systems.

As appreciated from FIG. 3, when the vehicle cruises at the set cruise speed $V_s$ and the vehicle arrives at an ascending slope, the vehicle speed is reduced to $V_s$−ALPHA and the automatic transmission shifts down to third speed range from the four speed range to accelerate the vehicle. However, at this time, since the set vehicle speed is reduced to $V_s$−BETA and the vehicle speed is controlled to $V_s$−BETA during the predetermined time T, the abrupt acceleration does not occur as in the conventional case denoted by B' and the occupant(s) does not feel the abrupt acceleration. After the passage of the predetermined time T, the shift-up operation occurs and the set cruise speed is returned to the original vehicle speed $V_s$.

Although in the preferred embodiment the shift-up operation occurs after the predetermined time has elapsed since the shift down operation occurs, the shift-up operation may occur according to the vehicle speed and opening angle of the throttle valve by means of the automatic transmission. In this case, the vehicle speed is returned to the original set cruise speed.

As described hereinabove, in the system and method for automatically controlling the vehicle speed to the desired cruise speed according to the present invention the shift stage of the automatic transmission is automatically shifted down and the set vehicle speed is reduced by the predetermined value. Therefore, in a case where the vehicle runs on an ascending slope and the vehicle speed is reduced, no undesirable feeling of abrupt acceleration occurs and the vehicle comfortability caused by the automatic cruise control can be assured.

It will be fully appreciated by those skilled in the art that the foregoing description is made in terms of the preferred embodiment and various changes and modifications may be made without departing from the scope of the present invention which is to be defined by the appended claims.

What is claimed is:

1. A system for automatically controlling speed of a vehicle to a desired cruise speed, comprising:
   (a) first means for detecting current speed of the vehicle;
   (b) second means for deriving a set command for a desired cruise speed for the vehicle;
   (c) third means responsive to the set command derived from the second means and the detected current speed derived from the first means for:
      (i) storing the desired cruise speed,
      (ii) deriving an indication of a speed difference between the current vehicle speed and the desired cruise speed, and
      (iii) adjusting an operating variable of an engine driving force adjusting mechanism for the vehicle on the basis of the derived speed difference indication so that the current vehicle speed substantially coincides with the stored cruise speed;
   (d) fourth means for deriving an indication of whether the current vehicle speed is less than the desired cruise speed by at least a first predetermined value;

(e) fifth means for selectively shifting down a transmission mechanism of the vehicle in response to the indication derived by the fourth means; and (f) sixth means for updating the stored cruise speed to reduce the desired cruise speed by a second predetermined value which prevents an abrupt torque increase of the vehicle engine in response to the indication derived by the fourth means.

2. The system of claim 1 further comprising seventh means for:
(i) deriving an indication of the occurrence time of the shift down performed by the fifth means, and
(ii) determining whether a predetermined time has elapsed since the occurrence time of the shift down, and eighth means for shifting up the transmission mechanism in response to the predetermined time elapsing.

3. The system of claim 2 further comprising ninth means for returning the updated cruise speed to the originally stored cruise speed and shifting up the transmission means in synchronization with the eighth means.

4. The system of claim 3, wherein the seventh means deenergizes an overdrive cancelling solenoid to activate the transmission into the overdrive mode.

5. The system of claim 4, wherein the transmission mechanism is an automatic transmission.

6. The system of claim 5, wherein the fifth means shifts down from a fourth speed overdrive range of the automatic transmission to a third range.

7. The system of claim 6, wherein the fifth means includes an overdrive cancelling solenoid for cancelling the overdrive mode by energization of the fourth means.

8. The system of claim 1, wherein the first predetermined value is 6 Km/h and second predetermined value is 4.5 Km/h.

9. The system of claim 1, wherein the engine driving force adjusting mechanism includes an engine throttle valve and the operating variable includes an opening angle of the throttle valve.

10. A method of automatically controlling speed of a vehicle to a desired cruise speed, comprising the steps of:
(a) detecting current vehicle speed;
(b) storing an indication of desired cruise speed for the vehicle;
(c) deriving an indication of the difference between the detected current vehicle speed and the indication of stored cruise speed;
(d) adjusting an operating variable of a driving force adjusting mechanism of an engine of the vehicle in response to the indication of the speed difference so that the vehicle speed substantially coincides with the stored cruise speed;
(e) determining whether the detected current vehicle speed is less than the stored cruise speed by a first predetermined value;
(f) shifting down a transmission mechanism of the vehicle when the detected vehicle speed is less than the stored cruise speed by the first predetermined value and simultaneously updating the stored cruise speed to reduce the stored cruise speed by a second predetermined value; and
(g) adjusting the vehicle speed so that it substantially coincides with the updated cruise speed.

* * * * *